US006596089B2

(12) United States Patent  
Smith et al.

(10) Patent No.: US 6,596,089 B2
(45) Date of Patent: Jul. 22, 2003

(54) SUBSEA PIG LAUNCHER PISTON PIG (75) Inventors: Brian Smith, Worksop (GB); Jay S. Mandke, Katy, TX (US)

(73) Assignees: Halliburton Energy Services, Inc., Houston, TX (US); General Signal UK Limited, Stockport (GB)

(*) Notice: Subject to any disclaimer, the term of this patent is extended or adjusted under 35 U.S.C. 154(b) by 0 days.

(21) Appl. No.: 09/898,427

(22) Filed: Jul. 2, 2001

(65) Prior Publication Data

US 2002/0059687 A1 May 23, 2002

Related U.S. Application Data (63) Continuation-in-part of application No. 09/714,334, filed on Nov. 16, 2000, now Pat. No. 6,537,383.
(60) Provisional application No. 60/246,769, filed on Nov. 8, 2000.

(51) Int. Cl.⁷ .................. B08B 9/04; B08B 9/055; B08B 1/00; F16L 45/00
(52) U.S. Cl. ................ 134/8; 15/104.061; 15/104.062; 15/3.5
(58) Field of Search .............. 15/104.061, 104.062, 15/3.5, 3.51; 134/8

(56) References Cited

U.S. PATENT DOCUMENTS

| 3,175,240 A | 3/1965 | Hillard ............... 15/104.06 |
| 3,857,132 A | * 12/1974 | Knapp et al. ......... 15/104.061 |
| 5,139,576 A | 8/1992 | Davis ..................... 134/8 |
| 5,208,936 A | * 5/1993 | Campbell ............ 15/104.061 |
| 5,913,637 A | 6/1999 | Rajabali et al. ......... 405/169 |
| 6,022,421 A | 2/2000 | Bath et al. ................ 134/8 |

FOREIGN PATENT DOCUMENTS

| DE | 28 01 378 | * 7/1979 | ............ 15/104.061 |

OTHER PUBLICATIONS

Mike Cunningham, "Remotely Operable Subsea Pig Launcher", ASME International publication (2001).
Oceaneering Intervention Engineering Publication "Multiple Pig Launcher", (2001).

* cited by examiner

Primary Examiner—Zeinab El-Arini
(74) Attorney, Agent, or Firm—Conley Rose, P.C.

(57) ABSTRACT

A piston pig for pushing pigs from a larger diameter conduit into a smaller diameter conduit, where one embodiment includes a cylindrical body with a first sealing disc attached to the body and adapted to seal against the larger diameter conduit and maintain a pressure differential across the body of the piston pig. The piston pig also includes a second sealing disc attached to the body and capable of sealing against the smaller diameter conduit and maintain a pressure differential across the body. Certain embodiments also include a pressure control device, such as a resilient flapper disc, to limit the differential pressure across the body. Some piston pig embodiments may also include an end cap attached to, and slidable relative to, the body, where the end cap has a closed position in which fluid cannot bypass the end cap and an open position in which fluid can bypass the end cap.

9 Claims, 5 Drawing Sheets

SUBSEA PIG LAUNCHER PISTON PIG

CROSS-REFERENCE TO RELATED APPLICATIONS

This is a continuation-in-part application of U.S. patent application Ser. No. 09/714,334, filed Nov. 16, 2000 now U.S. Pat. No. 6,537,383 and entitled "Subsea Pig Launcher," and claims the benefit of 35 U.S.C. 119(e) of U.S. Provisional Application Ser. No. 60/246,769, filed Nov. 8, 2000 and entitled "Subsea Pig Launcher," both of which are hereby incorporated herein by reference.

STATEMENT REGARDING FEDERALLY SPONSORED RESEARCH OR DEVELOPMENT

Not applicable.

BACKGROUND OF THE INVENTION

The present invention relates generally to subsea pig launching, and more particularly to a method and apparatus for storing and sequentially launching multiple pigs from a remote location. Still more particularly, the present invention is a method and apparatus for launching a series of pigs over a relatively long period of time.

In the oil and gas industry, it is common to remove petroleum deposits and other debris from pipelines by pushing a cylindrical scraper, referred to as a "pig," through the lines using fluid pressure. The pig is introduced into the pipeline from a launching system that typically includes a releasable retainer for retaining the unlaunched pig and a source of fluid pressure connected to the housing behind the pig.

Subsea satellite wells, manifolds or templates in deepwater are typically connected to a host platform located in shallow water via subsea flowlines that transport the produced hydrocarbon fluid along the sea floor. Such systems are often referred to as "tie-back" systems. As with other types of pipelines, flowlines in tie-back systems need to be pigged periodically during their operation to remove paraffin deposits, displace liquids, etc. The traditional method of pigging such flowlines has been to use "round trip pigging," which requires a pair of parallel flowlines between the host platform and the manifold or the wellhead. Pigs are typically launched from and received at the host platform, traveling outward through one flowline and returning through the other.

A more economical option for deepwater flowlines is to use "single trip pigging" using a single flowline between the manifold and the host platform. In single trip pigging, the pigs are launched from a pig launcher mounted on the subsea manifold and received on the host platform. The pig launcher can also be mounted on a wellhead or a pipeline end manifold (PLEM) sled, which is connected to production manifold/wellhead via jumpers.

In order to maximize the advantage of a single trip pigging system, the cost of offshore intervention in the system should be minimized. Such intervention is required either to replace the pigs in the launcher or to retrieve the launcher and recharge it with a new set of pigs after the previous set has been launched into the flowline. This implies that the pig launcher should be able to hold a large number of pigs and, for deepwater application, all pigging operations should be performed using an ROV or remotely from the host platform.

Furthermore, depending on the pigging operation frequency, the pigs are likely to be left in the launcher over a long period, as much as one to two years. However, since conventional pigs tend to degrade when exposed to hydrocarbons or methanol for a long period, conventional pigs cannot be left exposed to hydrocarbons or methanol while they are stored in the pig launcher. Hence, it is further desired to provide a pig launching system that does not store the pigs in either production fluids or methanol.

BRIEF SUMMARY OF THE INVENTION

The present invention provides an apparatus for launching pigs into a subsea flowline that connects a subsea manifold, template or a wellhead to a hostplatform and provides a reloading apparatus that can be used in conjunction with an ROV and can carry several pigs and deploy them remotely into a subsea pig launching apparatus.

One preferred embodiment provides a piston pig for pushing pigs from a larger diameter conduit into a smaller diameter conduit. The piston pig includes a cylindrical body with a first sealing disc attached to the body and adapted to seal against the larger diameter conduit and maintain a pressure differential across the body of the piston pig. The piston pig also includes a second sealing disc attached to the body and capable of sealing against the smaller diameter conduit and maintain a pressure differential across the body. Certain embodiments also include a pressure control device, such as a resilient flapper disc, to limit the differential pressure across the body in a direction opposite to the intended direction of movement and allow fluid flow against the direction of the pig. Some piston pig embodiments may also include an end cap attached to, and slidable relative to, the body, where the end cap has a closed position in which fluid cannot bypass the end cap and an open position in which fluid can bypass the end cap so as to limit the differential pressure across the pig, thus limiting the forward speed of the piston pig.

The subsea pig launcher described herein addresses the issues identified above. While the subsea pig launcher is described in the following discussion as being installed on a manifold, the present apparatus can be easily adapted for other applications, such as pigging from a subsea wellhead, template or a pipeline end manifold (PLEM) sled at the end of flowline.

More particularly, a method and apparatus have been developed for loading multiple pigs into a subsea pig launcher barrel, storing them inside the barrel over an extended period of time and then releasing the pigs remotely, one at a time, into a subsea flowline or pipeline as needed. The inside diameter of the launcher barrel is preferably slightly larger than the outside diameter of the pigs, so as to allow easy movement of pigs inside the barrel. Since the pigs are pushed inside the barrel by a positive fluid pressure, the system can operate even with the barrel made to fit the pig outside diameter. The top or rearmost pig is constructed so that its outside diameter seals against the inside wall of the barrel, and is therefore referred to as the "piston pig."

The pigs are advanced inside the barrel by providing hydraulic fluid under pressure behind the piston pig. This advances the stored pigs until the foremost pig is adjacent to a chamber called the "pig parking chamber" at the bottom of the barrel. The entrance of the pig parking chamber can be opened to allow the foremost pig to enter the chamber. In the chamber, the foremost pig is held between two pig stops. A kicker line connected to the parking chamber is provided for pumping hydraulic fluid behind the parked pig. By releasing the lower pig stop and pumping hydraulic fluid under pressure through the kicker line, the foremost pig can be launched into another chamber called the "pig launching chamber." The pig launching chamber preferably has an isolation valve at each end, which isolates it from the production header and flowline on one side and the pig parking chamber on the other side. A production kicker line connected to the launching chamber permits introduction of production fluids (hydrocarbons) behind the pig inside the launching chamber. The hydraulic fluid to be used for pushing pigs can be similar to the control fluids conventionally used for subsea systems, or can be any other suitable fluid that has a density greater than seawater, is environmentally acceptable, and is chemically non-reactive with the pig material.

From the launching chamber, the pig is pushed into the production header by opening the isolation valve between the production header and the launching chamber. Once the pig travels from the production header into the flowline, the isolation valve between the launching chamber and the production header is closed. The launching chamber is preferably then flushed with methanol and then, if required, with hydraulic fluid to wash out the residual hydrocarbon fluids.

After all pigs have been launched, the closure at the top of launcher barrel is opened by ROV (remotely operated vehicle) and a new set of pigs is stacked inside the barrel. The apparatus of the present invention, and in particular the pig storage barrel and pig parking chamber, provide several useful advantages over conventional systems. By separating the pig launching from the pig storage, the present system allows the pigs to be stored in hydraulic or control fluid, i.e. fluid that will not degrade the pigs, and also ensures that sufficient fluid volume is available to launch the pigs.

The hydraulic fluid to be used for pushing pigs can be similar to the control fluids conventionally used for subsea systems, or can be any other suitable fluid that has a density greater than seawater, is environmentally acceptable, and is chemically non-reactive with the pig material.

BRIEF DESCRIPTION OF THE DRAWINGS

For a more detailed understanding of the preferred embodiments, reference is made to the accompanying Figures, wherein:

FIG. 3b is a plan view of a preferred piston seal of the piston pig of FIG. 3a;

DETAILED DESCRIPTION OF THE PREFERRED EMBODIMENTS

Figure 1:
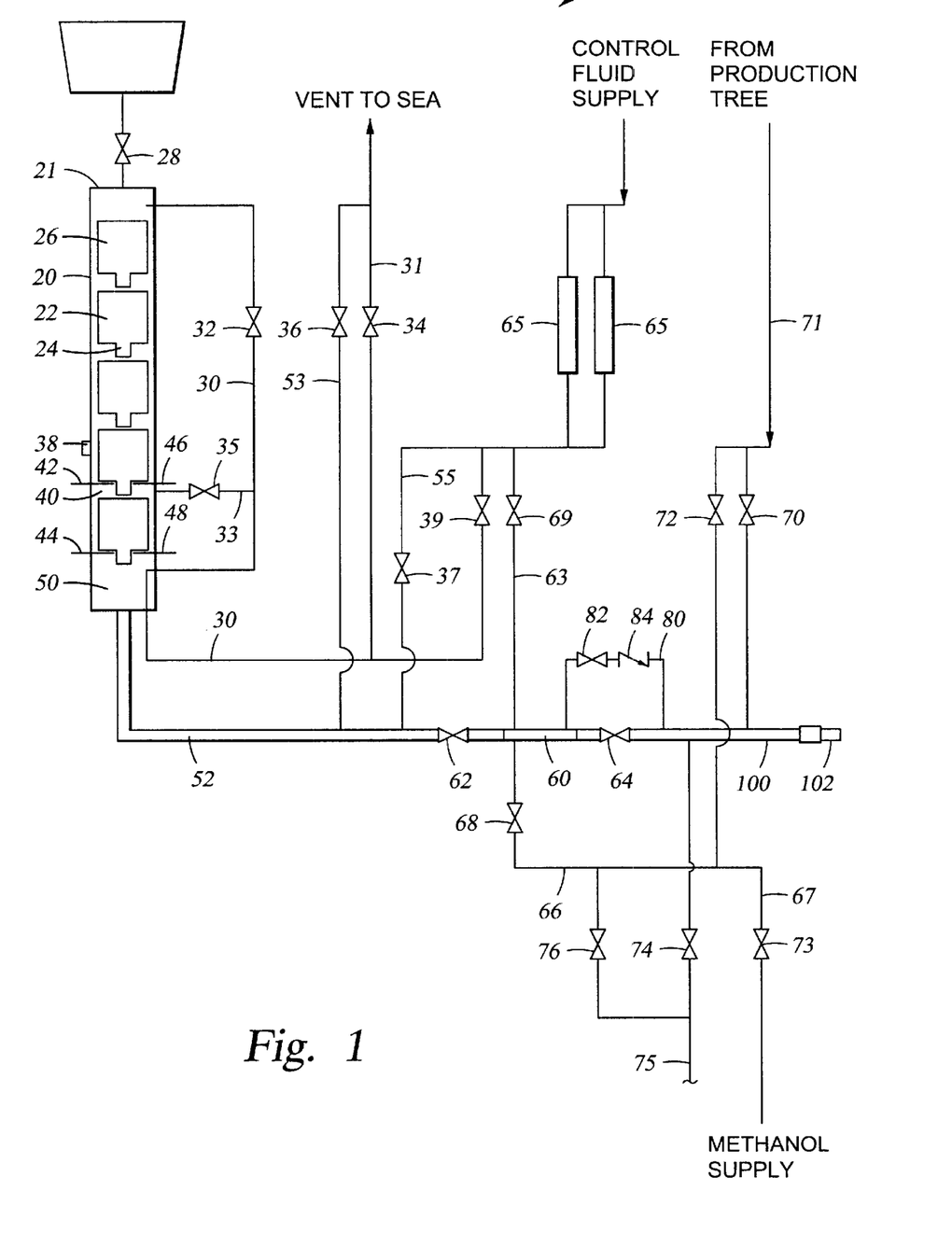
FIG. 1 is a schematic illustration of an apparatus constructed in accordance with a preferred embodiment of the present invention.
Figure 2:
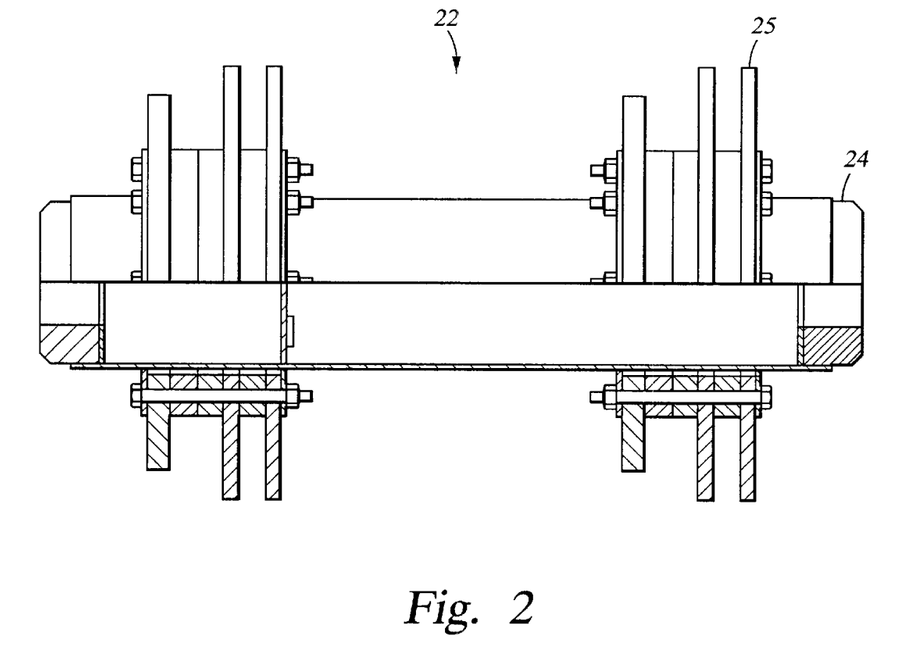
FIG. 2 is a side view, partially in cross-section, of a preferred pig configuration suitable for use in the apparatus of FIG. 1.

Referring initially to FIG. 1, a preferred embodiment of the present subsea pig launcher assembly 10 includes a pig storage barrel 20, which is preferably sized and configured to receive a ten to twelve pigs 22 stacked end to end. Although the discussion that follows and the attached Figures show barrel 20 installed on the manifold in vertical orientation, it will be understood that the system can be adapted for horizontal or inclined orientation of barrel 20. The inside diameter of barrel 20 is preferably slightly greater than the outside diameter of the pigs. This facilitates easy movement of pigs 22 inside the barrel Referring briefly to FIG. 2, in a preferred embodiment, pigs 22 each have an extending nose section 24, which facilitates stacking them directly and maintains a space between their radially extending fins 25. The pigs 22 may be of any style or manufacture known in the art and used in pipeline pigging operations. Each pig 22 may be fitted with any of various pipeline-cleaning or other special devices around its circumference, such as are known in the art. The last pig loaded into the barrel 20 sealingly engages the barrel 20 and is known as the piston pig 26.

Referring back to FIG. 1, at the top of barrel 20 is a valve 28, which closes the inlet end 21 of barrel 20. Other types of closures can be used in place of valve 28. When valve 28 is open, pigs 22 can be loaded into barrel 20. A debris cap (not shown) above the valve is used to protect the valve inlet. It is preferred that valve 28 be operated "manually," although it is also contemplated that valve 28 could be remotely actuable.

If desired, a magnetic sensor 38 mounted on the barrel detects the passage of the piston pig, which includes a preinstalled magnet. Sensor 38 can be used to send a signal to inform the operator to reload a new stack of pigs into the barrel. It will be understood that other types of sensing devices can be used to sense the passage of the piston pig 26 and that sensor 38 can alternatively be mounted at other suitable points along the launching apparatus 10.

Below pig storage barrel 20 is the pig parking chamber 40. Parking chamber 40 is defined by an upper pig stop 42 and a lower pig stop 44. Pig stops 42, 44 are preferably spaced one pig length apart. A spare set of pig stops 46, 48 can be provided as a backup. All pig stops are preferably provided with actuators for remote operation. The inside diameter of parking chamber is preferably selected to substantially fit the pig outside diameter. A parking chamber kicker valve 35 allows hydraulic fluid under pressure to flow behind the pig inside the parking chamber so as to push the pig out of the chamber when lower pig stop 44 is released.

A hydraulic line 30 connected near the top of barrel 20 allows hydraulic fluid or control fluid to be introduced under pressure behind the piston pig 26. Hydraulic line 30 is controlled by a remotely actuated valve 32. Providing hydraulic or control fluid under pressure behind piston pig 26 advances piston pig 26 and the other pigs down the barrel. A branch line 33 controlled by a valve 35 connects hydraulic line 30 to pig parking chamber 40. At its other end, hydraulic line 30 connects to vent line 31, which is controlled by valve 34, and to a fluid supply system that includes fluid accumulators 65, a direct fluid supply line, or other possible configuration. A valve 39 controls fluid flow to line 30. Thus, hydraulic line 30 can also be used as a vent line for discharging the seawater from barrel 20 during loading of pigs into the barrel. As mentioned above, the hydraulic or control fluid to be used for pushing pigs can be similar to the control fluids conventionally used for subsea systems, or can be any suitable fluid that has a density greater than seawater, is environmentally acceptable, and is chemically non-reactive with the material (polyurethane) used in pigs.

At the bottom of the barrel is the hub of a dual bore mechanical connector 50 (collet type or alternate), which attaches the barrel to the system downstream on the manifold. Docking guides, a soft landing system (not shown) and an alignment funnel (not shown) are preferably included to ensure proper orientation of the respective hubs during the connector makeup. Connector 50 is hydraulically operated to make-up and break the connection between storage barrel 20 and the manifold. The dual bore connector 50 provides a connection between barrel 20 and manifold pipe 52 connected to the flowline header for the pig transfer and also between the hydraulic line sections on the manifold 30 and on the launcher.

A vent line 53 is preferably provided on manifold 52 and is controlled by valve 36. Hence, valves 34 and 36 allow venting of fluids from the launcher barrel from the bottom and the top, respectively, as explained in detail below. Similarly, a fluid supply line 55 provides hydraulic or control fluid under pressure from accumulators 65 to manifold pipe 52. As disclosed above, direct hydraulic supply from hoses connected to host platform can provide adequate fluid supply in some cases. Flow through line 55 is controlled by valve 37.

Downstream of manifold pipe segment 52, is a pig launching chamber 60. Upstream and downstream isolation valves 62, 64, respectively, enclose the ends of the launching chamber 60. A flush line 63, which is controlled by valve 69, connects the upstream end of launching chamber 60 to the supply of control or hydraulic fluid 65. The downstream end of launching chamber 60 is preferably connected via valve 64 to the manifold production header 100, which in turn connects to the subsea flowline 102. A plurality of production lines 71, 75 feed produced hydrocarbons from wells into production header 100 downstream of valve 64. Fluid flow through lines 71, 75 into production header 100 is controlled by valves 70, 74, respectively. In a preferred embodiment, each production line also supports a branch line that feeds produced fluids into a kicker line 66, which communicates with the upstream end of launching chamber 60. These branch lines are controlled by branch valves 72, 76, respectively. Production fluids from the wells can be introduced into pig launching chamber 60 via kicker line 66. If desired, a methanol feed line 67 can also be connected to kicker 66, with fluid flow being controlled by a valve 73. A remotely activated valve 68 controls fluid flow through kicker line 66. A crossover connection 80 between launching chamber 60 and production header 100 via a remotely operated valve 82 and a check valve 84 allows fluids to flow from launcher barrel 60 into the production header 100 while bypassing valve 64.

Upstream of valve 62, hydraulic fluid under pressure from accumulators 65 or hydraulic supply line 30 can be introduced into pig storage barrel 20. Hydraulic line 31 and vent valve 34 permit draining of fluids from the bottom of the barrel.

In one preferred embodiment all valves except valve 28 are remotely operated and valve 28 is operated by remotely operated vehicle. In an alternative embodiment, all valves are ROV operable.

Figure 3A:
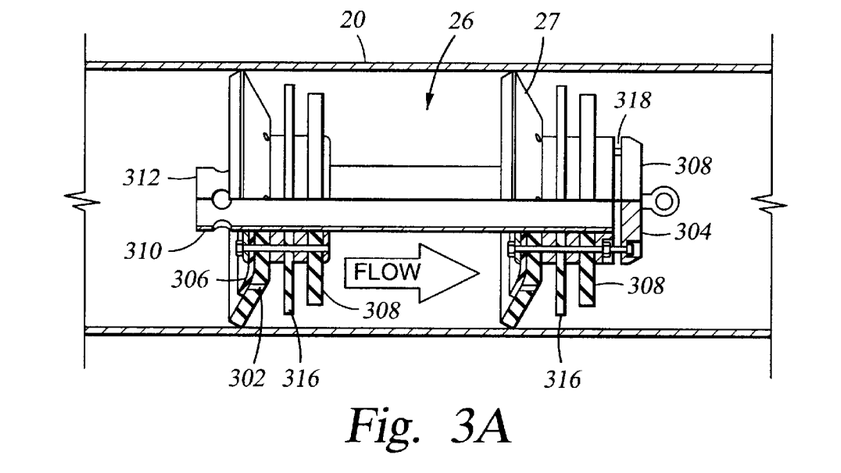
FIG. 3a is a side view, partially in cross-section, of a preferred piston pig configuration suitable for use in the apparatus of FIG. 1.
Figure 3B:
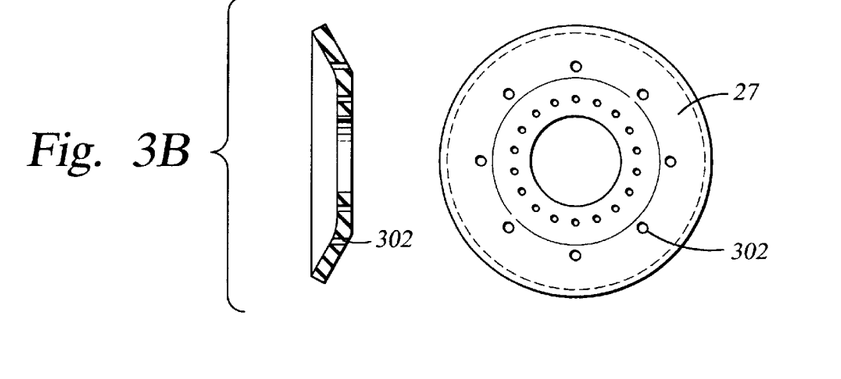
Figure 3C:
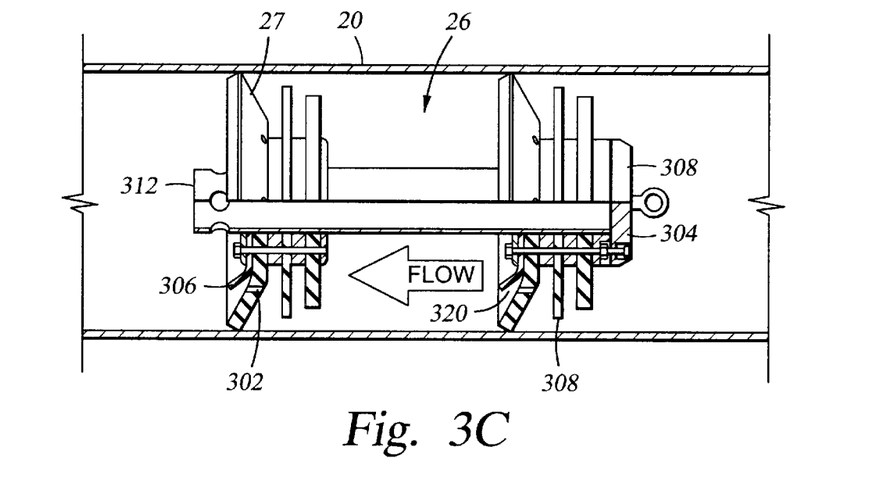
FIG. 3c is a side view, partially in cross-section, of a preferred piston pig configuration suitable for use in the apparatus of FIG. 1 shown during the purging operation.

Referring now to FIGS. 3a–3c, a preferred embodiment of the piston pig 26 is shown. Piston pig 26 has many of the features of a normal pig 22, including a cylindrical body 310, a front bumper 308, guides 314, and sealing discs 316. Because piston pig 26 must be able to seal in both the pipeline and in the barrel 20, it is equipped with a larger diameter piston seal 27, which sealingly engages barrel wall 20. According to a preferred embodiment, piston pig 26 also includes at least one flapper 306 adjacent to the back, or pressure, side of seal 27. The cylindrical body 310 of the piston pig 26 is preferably made of a relatively rigid material such as steel. The remaining components are preferably made from a relatively pliable material, with guides 314 being the stiffest and flappers 306 being the most flexible material. Preferably, these materials can range from a shore hardness of 60 A to 85A and can be any number of materials common to the art, including rubbers, elastomers, and polyurethanes.

As can be seen in FIG. 3b, piston seal 27 has a plurality of penetrations 302 therethrough. FIG. 3c shows that when barrel 20 is being filled from the bottom up with fluid, penetrations 302 allow the flow of fluid from the front (lower) end 304 of pig 26 to the back (upper) end 316. The fluid shifts flapper 306 to an open position and thus opens a fluid path 320 through piston seal 27. As can be seen in FIG. 3a, when the direction of flow reverses, penetrations 302 are sealed by flapper 306, which prevents the flow of fluid from the back of the pig 316 to the front 304. Hence, flapper 306 allows a pressure differential to build up behind piston pig 26 so as to provide forward movement, as is required for pigging, but prevents a pressure buildup in front of the pig 26, thereby allowing the barrel 20 to fill with fluid from the base. Flapper 306 is preferably designed to open at a low differential pressure so as to prevent a buildup of pressure that would be sufficient to move the piston pig backward.

Figure 6A:
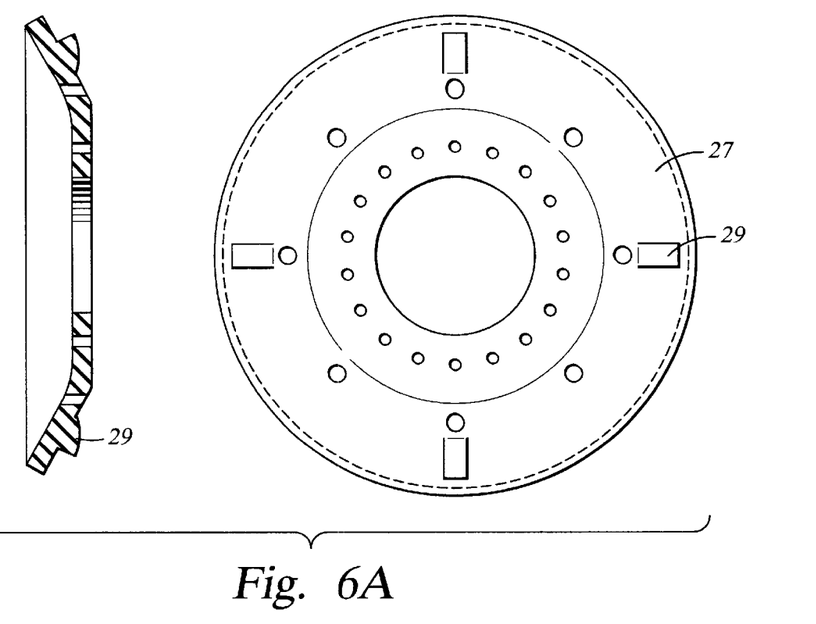
FIGS. 6a and 6b show examples of seal-mounted, buckle-inducing features.
Figure 6B:
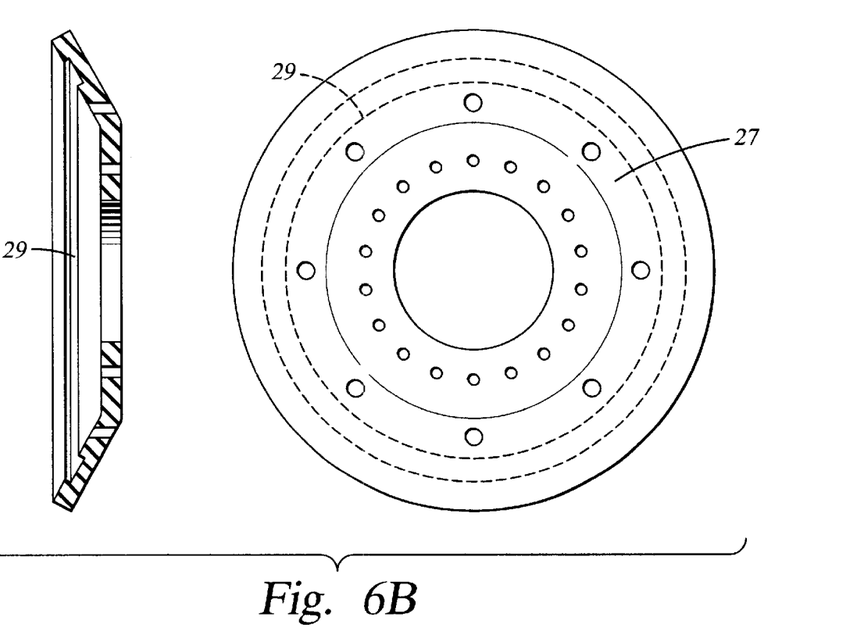

As the piston pig 26 moves from barrel 20 into manifold pipe 52, piston seal 27 conforms to the smaller diameter and radially extending fins 25 seal against the smaller inside diameter of the manifold pipe 52. In this configuration, piston pig 26 functions like a standard pig 22. In various preferred embodiments, piston seal 27 may have special features 29 that encourage its conforming to the smaller diameter. These features 29 may take the form of cuts, slots, or protrusions on the surface of the piston seal 27. Examples of such features are shown in FIGS. 6a and 6b.

The front bumper 308 is preferably attached to body 310 such that it is slidable with respect to body 310 and has a range of movement of approximately 0 to 2 inches relative to body 310. In a preferred embodiment, body 310 is provided with a closable fluid passage 318 therethrough. When bumper 308 is in its proximal position, it closes passage 318 and when bumper 308 is in its extended position, passage 318 is open. When the pig first enters the pipeline, bumper 308 is in its proximal position, as a result of the pigs being stacked. As the pressure behind the pig increases, bumper 308 moves forward, opening fluid path 318 and allowing fluid to bypass the pig. In this manner, bumper 308 acts as a check valve to limit the pressure buildup behind the piston pig 26 and thus limit the velocity of the piston pig 26 as it travels through the pipeline. The front bumper 308 is designed to maintain a high enough differential pressure so that the pig is moved through the pipeline. In an alternative embodiment, the front bumper 308 may be fixedly attached to the body 310 and fitted with a mechanical check valve to control the pressure differential across the pig. The piston pig 26, as well as the other pigs, may also be fitted with an attachment point 312 on either end for attaching to other pigs and to aid in the handling of the pig. The conventional bi-directional pigs are also fitted with a check valve or other means to limit the pressure behind the pig and therefore limit the travel speed of the pig.

Operation

Installing the Launcher: The pig delivery barrel 20 is installed on manifold 52 using multi-bore hydraulic connector 50. The connector is preferably configured such that the connection can be made using a remotely operated vehicle (ROV), such as that shown in FIG. 4, or other suitable ROV. The ROV preferably connects hydraulic control lines and electrical signal lines on pig storage barrel 20 to a control pod (not shown) on manifold 52 using flying leads. Pig storage barrel 20 is full of seawater after installation on the manifold. All valves except the branch valves 70, 74 that connect the individual wells to header 100, are closed.

Figures 4, 5:
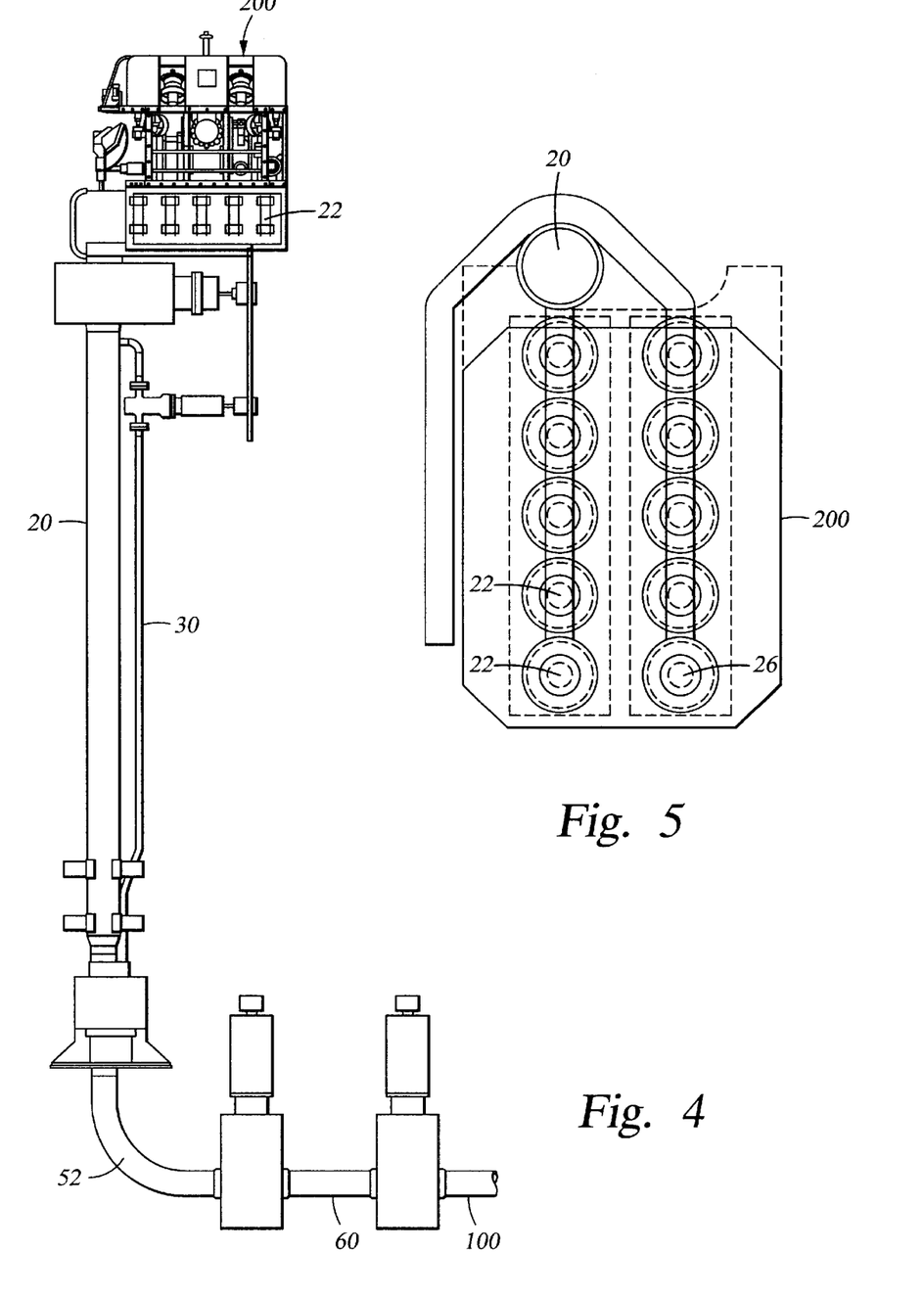
FIG. 4 is a schematic side elevation of a preferred embodiment of pig transfer equipment used in conjunction with the apparatus of FIG. 1.
FIG. 5 is a schematic plan view of the pig transfer equipment of FIG. 4.

Loading Pigs: Referring now to FIGS. 4 and 5, an ROV 200 carrying a predetermined number of pigs 22 lands on or connects to a platform at the top of storage barrel 20. The debris cap is opened by the ROV 200. The loading valve 28 at the top of the barrel is opened. Also, valve 32 and vent valves 34 and 36 are opened. ROV 200 preferably loads the pigs 22 into the barrel one at a time. The last pig to be loaded is piston pig 26, after which loading valve 28 is closed.

Flushing Pig Delivery Barrel: Valves 32 and 34 remain open. Valve 36 is closed. Hydraulic fluid under pressure is introduced at the bottom of the barrel by opening valve 37. The hydraulic fluid preferably has a higher density than seawater; hence it flushes the seawater from barrel 20 as it fills barrel 20 from the bottom. The radial fins 25 of the pigs 22 do not contact the wall of the barrel 20 and allow fluid to pass freely. The piston seal 27 of the piston pig sealingly engages the barrel 20 and prevents the flow of fluid. As the differential pressure across the piston pig 26 builds, flapper 306 opens allowing the flow of fluid through the penetrations 302 in the piston seal 27. During the flushing of the barrel 20, the front bumper 308 prevents the ingress of fluid through the base of the piston pig 26. As fluid fills the annulus between the body 310 and the barrel 20, fluid overflows the back 316 of the piston pig 26 and displaces the lighter seawater on the interior of the body 310. The seawater leaving barrel 20 exits through valves 32 and 34. Once barrel 20 is full of hydraulic fluid, which can be detected by observing the color or other property of the fluid at the vent port by the ROV 200, then valves 37, 32, 34 and 36 are closed.

Loading Pig into Parking Chamber: Upper pig stop 42 is opened, while lower pig stop remains closed. Fluid pressure across valve 62 is equalized by opening valves 37 and 69. Then valve 62 is opened, valves 37 and 69 are closed, and crossover valve 82 is opened. By opening valves 39 and 32, hydraulic fluid pressure can be applied behind piston pig 26 which closes flapper 306 against the penetrations 302 allowing piston seal 27 to maintain a pressure differential across the piston pig 26. This pressure differential advances one pig 22 into the pig parking chamber 40, where it is stopped by lower pig stop 44. Once a pig 22 is received in parking chamber 40, upper pig stop 42 and valves 39 and 32 are closed. Upper pig stop 42 prevents any additional pigs from entering chamber 40 until it is desired to launch another pig 22.

Loading Pig into Launching Chamber: Lower pig stop 44 and valves 39 and 35 are opened. This introduces hydraulic fluid under pressure behind the pig in parking chamber 40, causing it to advance into launching chamber 60. The fluid in front of the pig is dumped into production header 100 via crossover valve 82. After the pig is inside launching chamber 60, valves 39, 35, 62 and 82 are closed.

Launching Pig: Valves 76 and 68 are opened to equalize pressure inside launching chamber 60. Valve 64 is opened. The trees are choked down as necessary. Branch valves 70, 74 on some or all wells may be closed as necessary so as to divert production flow behind the pig and launch the pig into production header 100. After the pig is detected leaving production header 100, valve 64 is closed and the wells are brought back to full production.

Flushing Kicker Line and Pig Launching Chamber: All production kicker valves 72, 76 etc. between the wells and kicker line 66 are closed. Launching chamber isolation valve 64 is closed. Valve 68 remains open. Methanol injection valve 73 and bypass valve 82 are opened. This permits flushing of kicker line 66 and launching chamber 60 with methanol so as to displace any residual hydrocarbon fluid. After flushing with methanol, valves 82, 68, and 73 are closed. To flush launching chamber 60 with hydraulic fluid, which is optional, valves 82 and 69 are opened and high pressure control fluid is allowed to flush launching chamber 60. The excess control fluid is pushed into production header 100 via valve cross-over 82. After a sufficient time to ensure that chamber 60 is filled with control fluid, valves 82 and 69 are closed.

At this point, the pig launcher is ready to launch another pig into the flowline. Each launch cycle preferably includes the steps of flushing the components of the apparatus with a hydraulic or control fluid. The time period between launchings will vary, depending on the rate at which the downstream flowline accumulates buildup. During this time, the pigs may be sitting in the storage barrel for a period as long as one to two years. The last pig i.e., piston pig 26, is launched in the same manner as the other pigs.

It is preferred that each valve in the present system be remotely actuable. The valves can be hardwired to a controller, or can be configured to respond to radio, acoustic, electric, hydraulic or other types of signal. In addition, a microprocessor (not shown) can be provided for operating the various valves in sequence.

Although the invention is intended for deepwater pigging operations, it can be also used for pigging of flowlines in shallow water with the benefit of eliminating any diver intervention during such operations and also reducing the frequency of offshore intervention. The method and apparatus of the present invention make it possible to launch as many pigs as may be needed from a remote pig launcher without disconnecting the pig storage barrel from the launching apparatus. Also, because it separates pig storage and parking from pig launching, the present invention makes it possible to store the pigs in a hydraulic or control fluid that will not degrade the material from which they are made, and yet does not require the large volume of hydraulic or control fluid that would be needed if the same fluid were used to launch the pigs.

While a preferred embodiment of the present invention has been described, it will be understood that various modifications thereto can be made without departing from the scope of the present invention. For example, the precise positioning of various components, lines, and valves can be altered, the number and nature of various components, including barrels, chambers, accumulators and lines, can be altered, and the control and orientation of various components can be modified without affecting the operation of the present system. Likewise, while various steps may be disclosed or claimed in a particular order herein, it is not intended that any particular order be required unless such order is inherent in the carrying-out of the claim or explicitly recited.

What is claimed is:

1. A piston pig for pushing pigs from a larger diameter conduit into a smaller diameter conduit, comprising;

a cylindrical body with a first end and a second end;

a first sealing disc attached to said body and having a first diameter adapted to seal against the larger diameter conduit so as to maintain a pressure differential in which the pressure on the second end of said body is sufficiently higher than the pressure on the first end of said body to cause the piston pig to move in the direction of the first end of said body when the piston pig is in the larger diameter conduit; and a second sealing disc attached to said body and having a second diameter, smaller than the first diameter and adapted to seal against the smaller diameter conduit so as to maintain a pressure differential in which the pressure on the second end of said body is sufficiently higher than the pressure on the first end of said body to cause the piston pig to move in the direction of the first end of said body when said piston pig is in the smaller diameter conduit.

2. The piston pig of claim 1 further comprising a pressure control device in said first sealing disc that allows fluid to flow past said first sealing disc when the pressure at the first end of said body is exceeds the pressure at the second end of said body by a predetermined backpressure amount.

3. The piston pig of claim 2 wherein said pressure control device is in the form of a resilient flapper disc.

4. The piston pig of claim 1 wherein said first sealing disc is adapted to pass through said smaller diameter conduit.

5. The piston pig of claim 4, further comprising an end cap attached to said body and slidable relative to said body between a closed position in which fluid cannot bypass said end cap and an open position in which fluid can bypass said end cap.

6. A pig for use in a pipeline in which fluid flows in a first or second direction, the pig comprising;

a body with a fluid path therethrough;

a first sealing disc of a first diameter;

a first valve that permits fluid flow past said first sealing disc in the first direction only and maintains a differential pressure across the pig that is insufficient to move the pig in the first direction;

a second sealing disc of a second diameter; and a second valve that permits fluid flow through said body in the second direction only and maintains a differential pressure across the pig that is sufficient to move the pig in the second direction.

7. The pig of claim 6 wherein said second sealing disc has a smaller diameter than said first sealing disc.

8. The pig of claim 6 wherein said first sealing disc has a plurality of penetrations and said first valve comprises a means for opening and closing the penetrations in response to fluid pressure.

9. The pig of claim 6 wherein said second valve comprises a closure member attached to said body and slidable relative to said body between a closed position in which fluid cannot bypass said closure member and an open position in which fluid can bypass said closure member.

* * * * *